United States Patent
La Medica, Jr. et al.

(10) Patent No.: US 6,625,451 B1
(45) Date of Patent: Sep. 23, 2003

(54) PREFERRED ROAMING LIST AND SYSTEM SELECT FEATURE

(75) Inventors: Louis La Medica, Jr., Pittstown, NJ (US); Lee J. Whritenour, West Milford, NJ (US); John M. Vanderclock, East Hanover, NJ (US)

(73) Assignee: Bell Atlantic Mobile, Inc., Bedminster, NJ (US)

( * ) Notice: Subject to any disclaimer, the term of this patent is extended or adjusted under 35 U.S.C. 154(b) by 0 days.

(21) Appl. No.: 09/474,749

(22) Filed: Dec. 29, 1999

Related U.S. Application Data
(60) Provisional application No. 60/143,631, filed on Jul. 14, 1999.

(51) Int. Cl.[7] .................................................. H04Q 7/20
(52) U.S. Cl. ...................... 455/434; 455/432; 455/435; 455/552
(58) Field of Search ................................ 455/434, 432, 455/406, 62, 419, 556, 414, 435, 552, 565, 553, 557

(56) References Cited

U.S. PATENT DOCUMENTS

| | | | | | |
|---|---|---|---|---|---|
| 4,916,728 | A | * | 4/1990 | Blair | 455/455 |
| 5,734,980 | A | * | 3/1998 | Hooper et al. | 455/434 |
| 5,832,367 | A | * | 11/1998 | Bamburak et al. | 455/62 |
| 5,870,674 | A | * | 2/1999 | English | 455/432 |
| 6,118,995 | A | * | 9/2000 | Perdomo | 455/419 |
| 6,154,651 | A | * | 11/2000 | Hick et al. | 455/434 |
| 6,201,957 | B1 | * | 3/2001 | Son et al. | 455/406 |
| 6,405,028 | B1 | * | 6/2002 | DePaola et al. | 455/406 |
| 6,405,038 | B1 | * | 6/2002 | Barber et al. | 455/434 |
| 6,430,396 | B1 | * | 9/2002 | Bamburak et al. | 455/62 |

* cited by examiner

*Primary Examiner*—Dwayne Bost
*Assistant Examiner*—Ronald J. Ward
(74) *Attorney, Agent, or Firm*—McDermott, Will & Emery

(57) ABSTRACT

The System Select feature provides user selectable modes of operation in a mobile communication station, which allow certain fall-back options when a preferred system may not be available, but still steers the bulk of the system selection operations to preferred systems. In a first user selected mode, the mobile station scans for a broadcast system identifier or "SID" that matches an identifier of a preferred system stored in memory of the station. The second mode allows the user at least one option, which involves selection of a less than preferred system, but with this mode, the mobile station will still make a first attempt to register with a system having a SID matching one stored in memory of the station. A preferred implementation offers the user four system selection options. Options based on stored identifiers include an option to select only the home system, and an option to select from a preferred roaming list (PRL) if the home system is unavailable. In the other two options, if the scanning operations for the home system and systems on the PRL are ineffective, one option involves scanning a band corresponding to that used by the home system. In contrast, the other option involves scanning a band other than that used by the home system. The System Select programming, however, limits the operation in the last optional setting, for example to a set time period or until completion of one call. The preferred embodiment facilitates a substantially one-rate service, where the service provider charges the one rate for all calls through the home system, all systems on the PRL list and any system found during a scan of the home-system band.

40 Claims, 4 Drawing Sheets

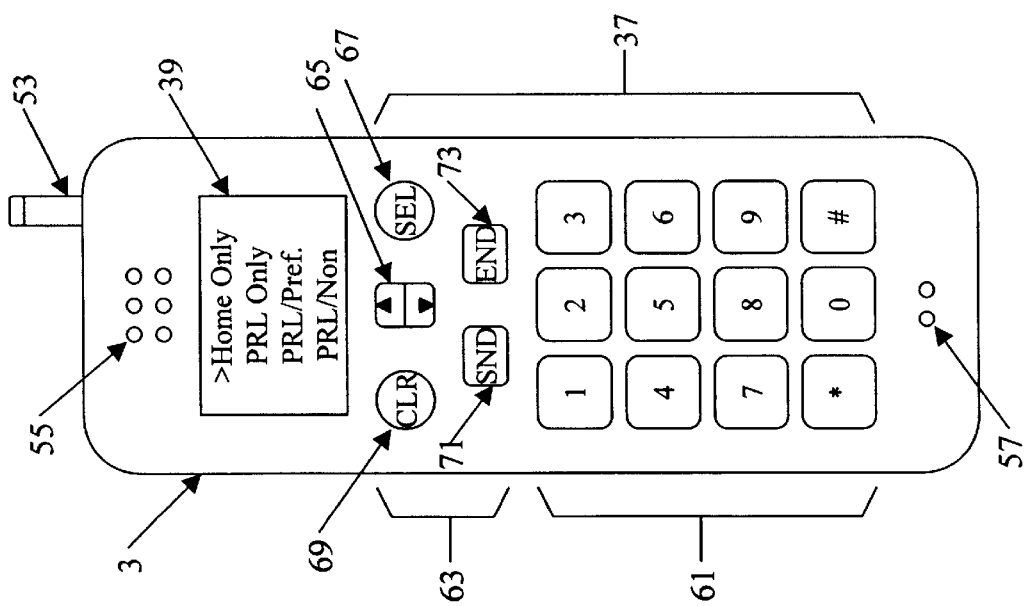

PREFERRED ROAMING LIST AND SYSTEM SELECT FEATURE

RELATED APPLICATION

This application claims the benefit of U.S. Provisional Application No. 60/143,631, entitled "PREFERRED ROAMING LIST AND SYSTEM SELECT FEATURE" filed on Jul. 14, 1999 by Louis La Medica, Jr., Lee J. Whritenour and John M. Vanderclock. The disclosure of the Provisional Application is incorporated herein entirely by reference.

FIELD OF THE INVENTION

The present invention relates to programming of mobile radiotelephones or the like, such as stations used in cellular service or personal communication service (PCS), to select systems using a carefully defined hierarchy of preferences but still allow the user certain options to select an available system even where the home and preferred systems may not be available. The invention also relates to a substantially one-rate type service, using stations implementing the system select feature.

BACKGROUND

Modern public wireless communication systems utilize a variety of cellluar and PCS technologies to offer customers mobility, specifically, the ability to make and receive telecom calls from anywhere that the wireless systems service. The networks or systems offering such services are becoming virtually ubiquitous. However, the systems are not homogenous. Different carriers operate different systems in different areas. In some cases, a station may operate with a large number of different systems, some of which may even implement different communications interfaces over the air-link.

Normally, a customer purchases service from a wireless carrier and obtains a mobile station compatible with the systems operated by that carrier. The carrier assigns the customer's station to one of the systems that the carrier operates, as that customer's "home" system. The station will often operate through that system, while the customer remains in the geographic area serviced by the home system. However, as the customer roams, the customer's mobile wireless station must register with and operate through other public wireless systems, some of which are operated by the service provider and many of which are operated by other carriers.

Throughout much of the United States, multiple carriers offer competing wireless communication services in the same or overlapping areas. Some competing systems utilize different technologies, but in many areas there may actually be two or more systems offering service in a manner compatible with a customer's station. Basic cellular service is divided into two bands, designated "A" and "B." Typically, different carriers operate competing systems on the two bands. Originally, if a local landline telephone company operated a cellular system in their region, they were assigned to operate on the "B" band, and independent cellular providers were assigned to the "A" band. Over time, the systems and attendant air rights have changed hands, so that today, many major carriers operate A-side systems in some regions and B-side systems in other regions. Most cellular phones today actually are capable of operating on both bands. As the customer roams, the station therefore needs to select and register with an available system offering a compatible service on one or more of the bands of normal operation.

With many of the early cellular services, the customer set the mobile station to one of several modes, and once set, the mobile station performed a specific type of system selection defined by the mode until the customer changed the setting to a different mode. For example, the customer might set the station to operate with an assigned "home" system. In this mode, the station would operate with only the home system until the user changed the mode. If the station was out of range of the home system, the station did not operate but continually scanned to try to find and register with the home system.

Similarly, the user could set the station to the "A" side or to the "B" side. In either mode, the station would scan for a system on the particular band, but would not look for or select a system on the opposite band unless or until the user changed the selection mode setting. In many cases, the customer actually set the station to a selection mode to obtain service while roaming in one area but left the station in that setting when roaming to another area or even returning home. This often resulted in the station selecting a system that implemented less than favorable roaming charges. For example, if the home system was on the "A" side, the favorable roaming arrangements typically were with other systems operating of the same band. However, if the customer set the station to the "B" side, for example, to obtain roaming service in an area where there was no "A" side service, the station might remain in that mode. The station would continue to select more expensive "B" side systems even if an "A" side system became available, for example to the exclusion of even the home system.

Later mobile stations allowed the user to selected "preferred" bands, typically A-preferred and B-preferred. In one of these modes, the station would first attempt to find a station on the preferred band and would scan the alternate band only if there was no system available on the preferred band. However, if the user set the station to the opposite preferred mode while roaming, the station would continue to operate in that mode, preferentially selecting the opposite-side systems over the home-side systems regardless of need or cost. Situations arose where an A-side agreement might be preferred in one area but a B-side roaming agreement might be more favorable in another area. For example, as carriers purchased different air-rights in different regions, the situation arose where a service provider might operate an A-side property in one region and operate one or more B-side properties in adjacent or surrounding regions. Selection of the service provider's own systems would provide the optimum operation and financial arrangements for the subscriber and the service provider. However, the "preferred" side selection techniques often result in selection of the unfavorable competing carriers' services even if the provider itself has a system available to service the roaming subscriber. In the example, if the subscriber selects A-preferred while in the home region and roams to an adjacent region, if a competitor's A-side system is available, the station selects the competing system even though the provider operates a B-side system in the adjacent area.

A number of automatic techniques have been developed and described in prior patents, to allow mobile telephone stations to more efficiently select service from available mobile telephone systems.

U.S. Pat. No. 5,586,338 to Lynch et al. teaches upgrading a cellular telephone system by modifying subscriber units for selective service provider acquisition during roaming. Priority of acquisition is given to those service providers associated with the home service provider. These preferred service providers are identified by System Identification (SIDs) numbers. A roaming subscriber unit will tune to control frequencies to identify all of the system providers operating in a physical area to which the subscriber has roamed. The subscriber station compares identified SIDs of the available systems to a list stored within the subscriber station. Selection is made based upon a priority of those system providers having arrangements with the home system provider.

U.S. Pat. No. 5,159,625 to Zicker teaches remote programming of system selection operations of a cellular mobile radiotelephone. More specifically, the programming causes the mobile telephone to select one of two or more frequency sets available for communication. The mobile telephone stores a list of system identification numbers (SIDs) that identify cellular systems for which cellular radiotelephone communication is to be prevented. In operation, the mobile telephone detects and displays when it is roaming. When roaming, the mobile telephone obtains a SID for the foreign cellular system upon which the telephone is currently configured to operate. The mobile telephone utilizes a first system selection process to select this foreign cellular system, which communicates on a first one of the sets of frequencies. The mobile telephone compares the SID of the foreign system to the stored list. If the default system's SID is not on the list, operation continues normally. However, if the foreign system is identified as undesirable by the list of SIDs, the programming of the mobile telephone instructs the telephone to shift over to communicate on a different frequency set and select a system using an alternate system selection process. If a new system selected by the alternate process is not available or if a new system is available but listed on the SID list, then the mobile telephone simulates a 'no service' mode of operation. However, if a new system selected by the alternate selection process is available and not identified as undesirable on the SID list, then the mobile telephone operates through the new system. After a predetermined duration of operation on the new system, the default selection process is restored to the first set of frequencies, and the procedure repeats.

U.S. Pat. No. 5,734,980 to Hooper, et al. discloses a technique for selecting the most preferred system among a number of available systems. A mobile terminal includes a random access memory, with a semi-permanent numeric access memory (NAM) for the mobile identification number (or "MIN") as well as the home system identification number (SID). The memory also stores a selection list of preferred systems. Each system identified on the list has an associated ranking, which identifies the degree of preference of the system relative to the other systems included on the list. To select a system for wireless communications, the mobile terminal scans a range of operating frequencies to detect wireless systems. Each time the terminal detects a wireless system, the terminal uses the list to determine whether the detected system is a most preferred system or a less preferred system. If the detected wireless system is most preferred, the terminal stops scanning and selects the detected wireless system for wireless communication. However, if the detected wireless system is a less preferred system, the terminal stores selection information for the system in a memory and continues scanning. Upon completion of the scanning, if the terminal does not detect a most preferred system, the terminal selects the highest-ranking system among the detected less preferred systems, for conducting its wireless communications.

U.S. Pat. No. 5,845,198 to Bamburak et al. discloses a system for searching for preferred providers, although if none are available, the station may register with less desirable systems. After power-up, the station clears a "non-optimal" flag and then determines whether the last service provider used before power-down was an optimal service provider. This may be determined by checking the stored SID of the last service provider against a list of optimal and preferred service providers stored in memory. If the last service provider was optimal, the station attempts to lock onto the control signal of the last service provider. If the last provider was not optimal, or if the lock to the last provider is unsuccessful, then the station initiates a global spectrum search. If a lock is successful, the station determines whether the control channel contains the SID of an optimal service provider by comparing the SID from the control signal with the list of optimal service provider SIDs. If the SID does not belong to that of an optimal service provider, the global spectrum search is executed and the identity of the frequency band in which the non-optimal SID was located is passed to a global search routine, so as to avoid unnecessarily searching this portion of the spectrum again. However, if it is determined that an optimal service provider has been located, the station registers with that service provider. If an optimal service provider is not available, the station selects a preferred available system for registration and sets the non-optimal flag.

As described in the U.S. Pat. No. 5,845,198, when in an idle state, the control system of the station simply monitors the control channel of the service provider for communication system overhead information and for paging information that may indicate an incoming communication. While in idle state, a timer is activated which permits a low-duty cycle search if the phone is presently registered in a non-optimal service provider system. This situation may arise if the global spectrum search selects a preferred but not optimal service provider. Periodically, such as every 5 minutes, a step is executed to determine whether the non-optimal flag has been set, if the non-optimal flag is not set, the control system returns to its idle state. However, if the non-optimal has been set, the check thereof leads to the execution of the periodic search routine, where a search is conducted in order to attempt to locate an optimal service provider. If the periodic search routine identifies an available optimal service provider, the non-optimal service provider flag is cleared and the mobile communication device registers with the optimal service providers as a result of the periodic search routine.

U.S. Pat. No. 5,832,367 to Bamburak et al. discloses a communication device that locates a wireless service provider in a multi-service provider environment using a frequency band search schedule. The frequency band search schedule identifies a first or "home" band and a several other frequency bands in a predetermined order. The order of the frequency bands may be programmed by the user or by a home service provider over the air. The communication device searches for an acceptable service provider by examining the home band and then the other bands listed in the frequency band search schedule, in the order specified by the search schedule. An acceptable service provider is identified by comparing a service provider identifier received from a band being examined with a list of acceptable service providers.

In U.S. Pat. No. 5,903,832 to Seppanen, et al., a mobile station maintains a single, prioritized list of all available networks (i.e., all public, residential, and private networks). Access to the various networks is then based on the user's needs. A first type of access is an automatic access, which requires little or no user involvement. A second type of access is to a user-specified network. A third type of access is to a user-specified service (e.g., data, fax, e-mail, etc.) that is supported by at least one of the networks. The mobile station can search for additional networks, and can also search for additional networks that support only a specified type of service, or for a network that supports a service not supported by networks that are already in the list. All of the networks can be searched at once so that the user can readily make a selection from the single, prioritized network list. The network priorities are user programmable by moving network names up and down in the list using a mobile station user interface, such as the mobile station's keypad. The higher the network name is placed in the list, the higher is the selection priority of the network.

U.S. Pat. No. 5,870,674 to English suggests selecting a communication system in accord with geographic region of the subscriber station. The subscriber station first attempts to determine its geographic region, by attempting to acquire a system that covers the region. Once the subscriber station has determined its geographic region, the subscriber station then determines whether the acquired system is the most desirable system for use in the geographical region. If it is the most desirable system for use in the geographical region, the subscriber station registers with the acquired system. If it is not the most desirable system for use in the geographical region, the subscriber station attempts to acquire a more desirable system.

Other patents relating to SID list processing include the following:

- U.S. Pat. No. 5,920,821 entitled "Use of Cellular Digital Packet Data (CDPD) Communications to Convey System Identification List Data to Roaming Cellular Subscriber Stations."
- U.S. Pat. No. 5,790,952 entitled "Beacon System Using Cellular Digital Packet Data (CDPD) Communication for Roaming Cellular Stations."
- U.S. Pat. No. 5,761,618 entitled "Updating Technique for Downloading New System Identification (SID) List Into a Handset."
- U.S. Pat. No. 5,613,204 entitled "Beacon System for Roaming Cellular Stations."
- The prior system selection techniques, exemplified in the above-discussed patents have provided somewhat effective system selection, useful for certain types of services. However, there are still circumstances in which these system selection techniques do not adequately balance the communication needs of the customers with the financial aspects of certain roaming services.

For example, a number of providers are now offering a single-rate wireless telephone service, purportedly allowing customers to obtain mobile telephone service at the one-rate from anywhere within a large geographic area. Such providers implement the one-rate service by programming the customers' stations with a list of identifiers for preferred systems, in a manner similar to several of the techniques disclosed in the cited patents. However, use of a system on the preferred list is absolutely mandatory. If a customer's station can locate and operate through one of the preferred systems identified in the list, the customer can receive service at the one-rate. However, for the one-rate service, anytime that there is no available system identified in the list, the customer receives no service at all. The station indicates "no service" and does not inform the user even though there may be alternate service available in the area.

With the AT&T one-rate service, for example, AT&T advertises that service is available anywhere in the United States. However, in several sections of the country, one of which is Asheville N.C., AT&T does not operate a system and does not have a preferential roaming agreement with a carrier serving that locale. AT&T customer stations therefore do not store identification data for any system at all, for that part of the country. Consequently, any AT&T customers roaming into such an area can not receive any service, not withstanding AT&T's advertisement of nationwide service.

A need therefore exists for a technique to select wireless service systems, that steers traffic to systems implementing favorable billing arrangements with a one-rate service provider but does not deny service simply because a customer roams outside areas serviced by such systems. A need exists for such a system that allows the customer some other options to obtain service, whenever some compatible system is available. The service selection technique, however, should minimize reliance on less than favorable roaming arrangements based on the customer's selections, to enable the provider to offer service on a one-rate plan or similar business structure. To the extent if any that a customer opts for a selection mode that may lock onto systems providing a least favorable financial arrangement, the station should automatically limit the financial exposure.

DISCLOSURE OF THE INVENTION

The present invention meets the above-stated needs and overcomes the problems with prior system selection techniques by providing user selectable modes of operation, which allow certain fall-back options when a preferred system may not be available, but still steers the bulk of the system selection operations to preferred systems. In a first mode, the mobile station scans for a broadcast system identifier or "SID" that matches an identifier of a preferred system stored in memory of the handset. The stored identifier may be that of the home system or the stored identifier may be one from a group of stored identifiers, typically including the identifier of the home system and other preferred systems. The second mode allows the user at least one option, which involve selection of a less than preferred system, but with this mode, the mobile station will still make a first attempt to register with a system having a SID matching one stored in memory of the station. A preferred embodiment limits operation in at least one type of second mode, so as to revert to the first mode after occurrence of a predetermined event.

With this approach, the customer has a choice of service when outside of the service footprint of the carrier with whom the customer subscribes. However, whenever practical, the phone will stay on the most desirable system available, as directed by the customer's carrier. If the user changes the system select mode to enable selection of a system not desirable by the carrier, in the preferred embodiment, the handset will automatically return to the more desirable system selection procedure even if the user forgets to manually change it back.

Thus, one aspect of the invention relates to a mobile communication station. The station includes a wireless transceiver for two-way communication via a selected one of a number of public wireless communication systems and for signaling with those systems. A programmable controller, coupled to the wireless transceiver, controls operation of the station including that of the transceiver. The station also includes a memory, for example, for storing one or more system identifiers. A user interface enables a user of the mobile station to provide a selection input to the programmable controller. The station also includes a program for execution by the programmable controller. The program execution causes the mobile station to operate in at least two modes in response to the selection input by the user. If a user selects a first mode, the programmable controller causes the transceiver to scan an air-interface only for a system identification matching an identifier stored in the memory and to register with a system broadcasting the matching system identification. However, if a user selects a second one of the modes, the station executes a hierarchical system selection procedure. The transceiver first scans the air-interface for a system identification matching an identifier stored in the memory of the mobile station, and if one is found, the transceiver registers with the system broadcasting the matching system identification. If the mobile station fails to detect a match for a stored identifier on the air interface, the transceiver performs an alternate scan of an air-interface to find an identifier for another system not identified in the memory of the mobile station. If the alternate scan detects an identifier of another system, the transceiver registers with that system.

In a preferred embodiment, the user interface comprises a display coupled to the programmable controller for displaying information including at least one mode selection option. The user interface also includes one or more keys coupled to the programmable controller for obtaining the selection input while the display shows the at least one mode selection option. The invention, however, encompasses other user interfaces, for example utilizing spoken command recognition and synthesized voice prompts.

The preferred embodiment actually implements four user selectable modes of operation. In a first of these modes, the transceiver scans the air-interface only for a system identification consisting of an identifier of a home system assigned to serve the mobile station and only locks onto or registers with a system broadcasting the home system identifier. In another mode utilizing stored identification, the memory stores a list of system identifiers for preferred public wireless communication systems, one of which may be that of the home system. In this mode the transceiver scans for and locks onto a system broadcasting an identification matching any one of the system identifiers contained in the list. The preferred roaming list of system identifiers may specify the system identifiers in a hierarchy of preference, e.g. based on best available cost.

The preferred embodiment implements two modes utilizing alternate scans, i.e. for systems not specifically matching stored identifiers. In one such mode, the transceiver scans for an available system on a band utilized by the station's home system. In the other of these modes, the transceiver scans for an available system on a band different from that utilized by the station's home system.

In the preferred embodiment, the system selection programming limits the operation in the alternate mode. This mode may be limited in duration or limited to one call for the station, particularly to one call through a system not identified in the station's memory.

Other aspects of the invention relate to a methodology and a software product used in implementation of the method for controlling system selections by a mobile communication station. The methodology involves detecting a first user selection, and in response, operating in a first mode. The operations in the first mode include scanning an air-interface to detect a system identification, and locking onto a system broadcasting the detected identification only if that identification matches an identifier stored in memory of the mobile station. Upon detecting a second user selection, the method involves operating the station in another system selection mode. The operational steps in this second mode include scanning the air-interface first for a system identification matching an identifier stored in the memory of the mobile station and locking onto a system if the detected identification of that system matches a stored identifier. However, in the second mode, if there is no match to a stored identifier, the station performs an alternate scan of an air-interface and locks onto another system not identified in the memory of the mobile station.

The system selection techniques of the present inventions also enable a wireless service provider to offer service covering a wide geographic area using one-rate billing for all or at least most of the calls made by the one-rate subscribers. This aspect of invention involves establishing a home wireless communication system for providing wireless services for mobile stations of the subscribers at the one rate. The one-rate service provider also identifies foreign wireless communication systems that are "preferred" systems. Typically, the preferred systems provide wireless services for mobile stations of the subscribers at a preferential rate, for example, at or near the cost of one-rate operation through the home system. Examples of such preferred systems include other systems operated by the service provider and systems operated by other providers that have contracted for preferential roaming charges with the one-rate service provider.

The one-rate service methodology involves storing system identifiers for the home system and the preferred systems in the mobile stations. The subscribers' mobile stations are programmed to selectively operate in two system selection modes in response to user inputs. In the first mode, a mobile station scans an air-interface to detect a system identification. The station registers only with a system broadcasting a detected identification matching an identifier stored in the memory of the mobile station.

In the second system selection mode, the station first performs a scan and selection routine for selecting a system matching an identifier stored in memory. In this mode, however, this scan is not exclusive. Here, if there is no match to a stored identifier detected during scanning of the air interface, the station performs an alternate scan of an air-interface, and the station may lock onto another system not identified in the memory.

In accord with the one-rate billing methodology, the subscribers receive substantial services at the one-rate. Specifically, the service provider bills calls at only the one rate, at least for all calls through the home system and all calls through any of the preferred systems.

In preferred embodiments, the service provider may also bill at the one-rate for calls completed through certain types of other systems detected in the alternate scanning of the second mode, for example for systems operating on the same band as the home system. While the roaming agreements with other carriers on the home-band may not be as favorable as those offered by preferred systems, such agreements typically are relatively reasonable. The one-rate service provider often will be able to accept the slightly higher costs for services through such alternative systems as part of the cost of offering the popular one-rate service, because the system selection modes will still effectively steer the bulk of all traffic through the home system and the preferred systems.

However, if the alternate scan will likely involve still less favorable conditions, for example to systems on a band different than that used by the home system, then the preferred methodology places a limit on operation in any mode that may result in calls through systems found in the alternate scan. The mobile station will inform the user of the limit, for example by means of a display indicating a limit of five minutes or one call. The one-rate service provider may opt to bill for such calls, though the rate may not conform to the one-rate plan. In many cases, however, the user may need to make other billing/payment arrangements with the operator of the selected system, for example by arranging billing for each individual call to the user's credit card account. Although single-rate billing may not be available in such a situation, the user can still obtain service.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the various figures, like reference numerals refer to the same or similar elements.

FIG. 3 is a simplified plan view, from a typical user's perspective, of an exemplary mobile station handset.

FIGS. 4A and 4B illustrate alternate formats for the display of the menu listing for the four system selection modes of the preferred embodiments.

FIGS. 5A, 5B and 5C illustrate certain displays that may be provided by the mobile station during operation of the mobile station to select a system in accord with the present invention.

DESCRIPTION OF PREFERRED EMBODIMENTS

The present invention uses a hierarchy of system selection techniques. In the preferred embodiments, the highest level technique is for the customer's station to select the home system assigned for that customer. The next highest level of selection enables the station to select systems identified in a preferred roaming list (PRL). The PRL list may identify various systems operated by the same service provider as the home system and/or systems of other service providers with whom the home service provider has negotiated favorable roaming agreements. Both of these first two modes rely on detection of a system identifier matching an identifier stored in a memory of the station. The selection hierarchy implemented by the customer station will include at least one and preferably two further selection techniques. Each such further technique first attempts to find a system whose identifier matches one in memory. The station will only select a less favorable system when the station can not find the home system or any system identified in the PRL list. In accord with the invention, the customer station enables the customer to set the selection mode, for example from a menu. In the preferred embodiments, at least one of the less favorable selection modes is limited, for example to a set period or a set number of calls.

To understand the invention, it may be helpful to consider the general structure and operation of a wireless telephone network. We will subsequently discuss a customer station for implementing the inventive system select feature and the program operation of the station to implement that feature and provide a one-rate type service.

Figure 1:
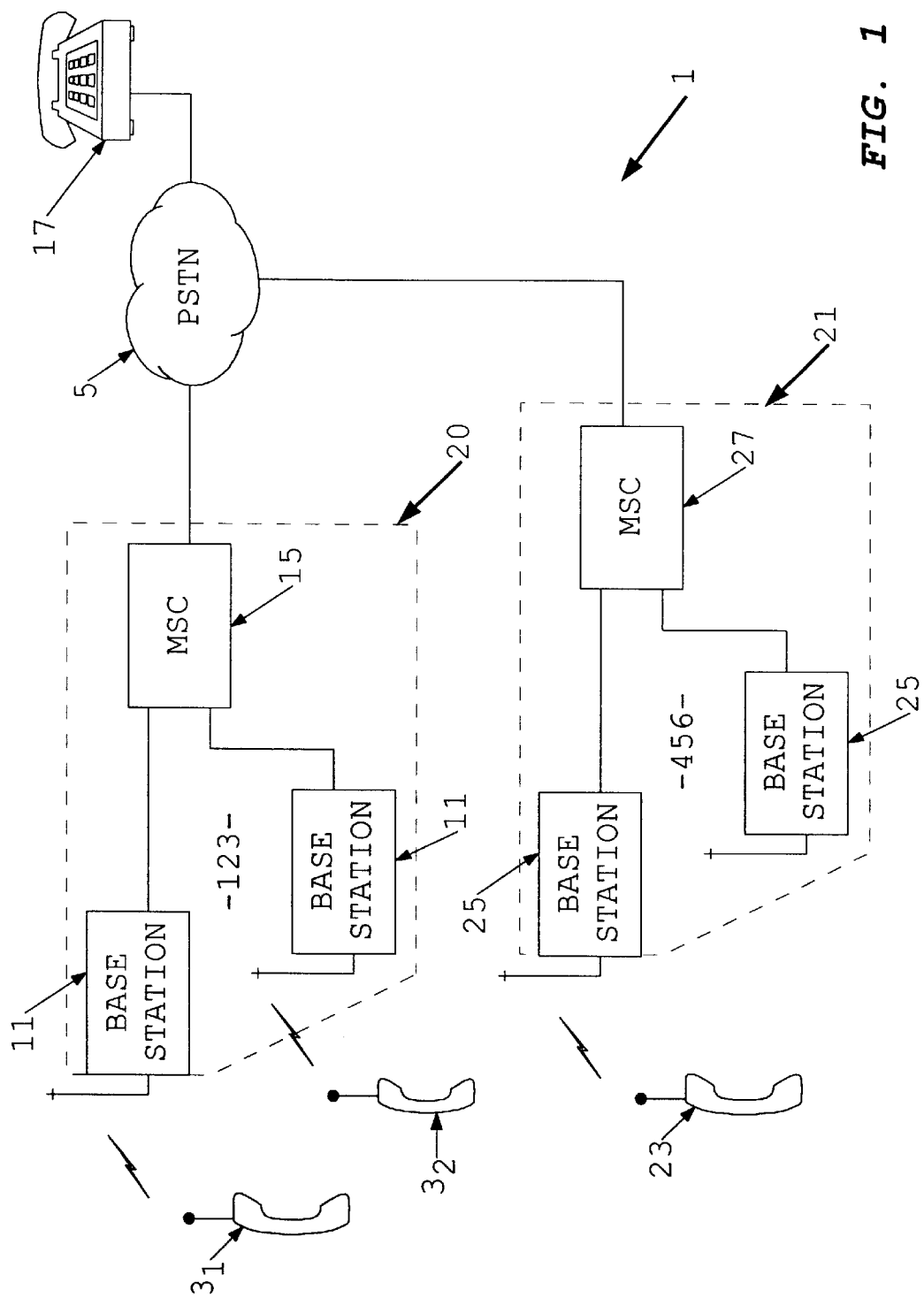
FIG. 1 is a simplified block diagram of a public wireless telephone network useful in explaining operations in accord with the invention.

FIG. 1 depicts a system for providing voice telephone communications and/or data communications, in accord with the invention. As shown, a wireless telephone network 1 provides cellular service and/or personal communications service (PCS) type services to mobile stations depicted by way of example as mobile handsets 3 and 23. The network 1 enables users of the mobile stations 3 or 23 to initiate and receive telephone calls to each other as well as to telephones 17 accessible through the public switched telephone network (PSTN) 5.

FIG. 1 shows a simplified version of a common wireless telephone network 1. The network 1 includes a number of wireless base stations 11, 25, typically providing cellular radio coverage over the geographic area serviced by the network 1. The base stations 11, 25 send and receive radio signals communicated to and from compatible mobile stations 3, 23. The base stations 11, 25 also communicate over trunk circuits to associated mobile switching centers (MSCs) 15, 27.

In the simple example shown, the base stations 11 and the MSC 15 form a first wireless service system 20. The base stations 25 and the MSC 27 form a second wireless service system 21. The systems may operate in the same or overlapping geographic areas to provide competing services, or the two systems may operate in different geographic regions.

In each system, the MSC controls the operations of the particular system and provides selective switched connections. The switched connections through the MSC 15 or the MSC 27 may connect base stations together, for example to enable calls between two mobile units 31, 32. The switched connections through the MSC 15 or the MSC 26 also provide selected call connections to the PSTN 5, for example to allow a user of mobile handset 23 to make a call to or receive a call from one of the landline telephone stations 17. The MSCs 15 and 27 may communicate with each other via trunks and/or signaling links not shown, for handling inter-system calls and for signaling to facilitate roaming.

The mobile stations 3 and 23, the base stations 11 and 25, and the MSCs 15 and 27 implement one or more standard air-link interfaces. In the preferred embodiment, the wireless telephone network 1 supports dual-mode services. Although not shown separately, such a dual-mode network includes wireless telephone components that output analog telephone signals for transmission according to an analog wireless protocol (e.g., AMPS) as well as digital wireless system components that operate in accord with a digital wireless protocol, for example the CDMA protocol IS-95. The base stations may provide both types of services. Alternatively, the network may comprise base stations that send and receive voice and signaling traffic according to the prescribed analog protocol as well as digital base stations that utilize the digital wireless protocol. Each dual-mode MSC 15 typically includes a switching subsystem for analog telephone services, a switching subsystem for digital telephone services, and a control subsystem. Other MSCs may implement only one type of service.

Digital wireless equipment is available today to support any one of several common interface standards, including time division multiple access (TDMA) and the Global System for Mobile communications (GSM). In the preferred embodiment, the digital wireless telephone components support the code division multiple access (CDMA) standards. With CDMA, each transmitted signal comprises a different pseudorandom binary sequence, also referred to as a pseudonoise (PN) sequence, which modulates a carrier signal, spreading the spectrum of the waveform. Thus, since each CDMA subscriber unit is assigned a unique PN code, a plurality of subscriber stations can send and receive CDMA signals sharing the same frequency spectnum. If these CDMA signals were viewed in either the frequency or time domain, the multiple access signals would appear to be superimposed on top of each other. The CDMA signals are separated in the receivers of the base stations or the subscriber stations by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system.

As will be familiar to those of ordinary skill, an air-link interface for each cellular service in a geographic area includes paging channels and/or signaling channels, as well as voice channels. The channels may be separate frequency channels, or the channels may be logically separated, for example based on time division or code division. The paging and signaling channels are used for preliminary coded communications between a cellular telephone and a cell site in setting up a telephone call, after which a voice channel is assigned or set up for the telephone's use on that call.

Each service company broadcasts a unique System Identification Number (SID) on all paging channels of the air-links on which it provides service in a given service area. Usually, the SID contains one to five digits. A cellular telephone 3 or 23 can thus determine which service company is providing service on a given paging channel by identifying the SID.

Cellular and PCS services today are available in many different areas. Also, in most areas, two or more competing operators provide such services. To help mobile stations 3 and 23 find and register with appropriate systems 20 and/or 21, each such system broadcasts its own SID on its paging or other signaling channels, as outlined above. For example, the system 20 may broadcast a SID of 123, whereas the system 21 may broadcast a SID of 456. The mobile stations 3 and 23 utilize the broadcast SIDs and stored SID information to identify their home systems as well as preferred systems. For example, the stations $3_1$ and $3_2$ would recognize the broadcast SID 123 as that of their assigned home system 20. Similarly, the stations 23 would recognize the broadcast SID 456 as that of their assigned home system 21. The stations also store hierarchical lists of preferred systems, other than their home system. For example, the stations 3 may recognize the SID 456 as the identifier of an affiliated system. The list of such systems is identified as a preferred roaming list or "PRL." The PRL list format and the attendant processing of the list preferably conform to the IS683A standards. In accord with the concepts of the invention, the stations also process the SIDs of available systems to determine when the home or preferred systems are unavailable and allow the user to select other options to continue to receive service from available systems.

For purposes of this discussion, we will assume that the service provider operating the system 20 provides a one-rate service to customers using the portable wireless handsets 3. With this service, the customers pay a single fixed rate for all services within a relatively wide geographic area. The one-rate may be a flat monthly charge alone or in combination with a single, set per-minute charge for air-time. The service area includes the area covered by the home system 20. The one-rate service area also includes some areas served by other systems, such as the system 21. Typically, the one-rate service provider operates some of the other systems 21 and has favorable roaming agreements with the operators of other foreign systems 21. There may be some regions, however, where that service provider has a less favorable agreement with the operator of a local system or has no agreement at all. The present invention steers most traffic to the home system and the preferred systems. The system select feature, however, allows the customer to set the selection mode of the station. One or more of the selectable modes enable selection of other systems when the home and preferred systems are not available. In at least certain circumstances, the one-rate billing plan also applies to calls through the less favored systems.

It may be helpful now to consider the structure and general operations of an exemplary wireless station.

Figure 2:
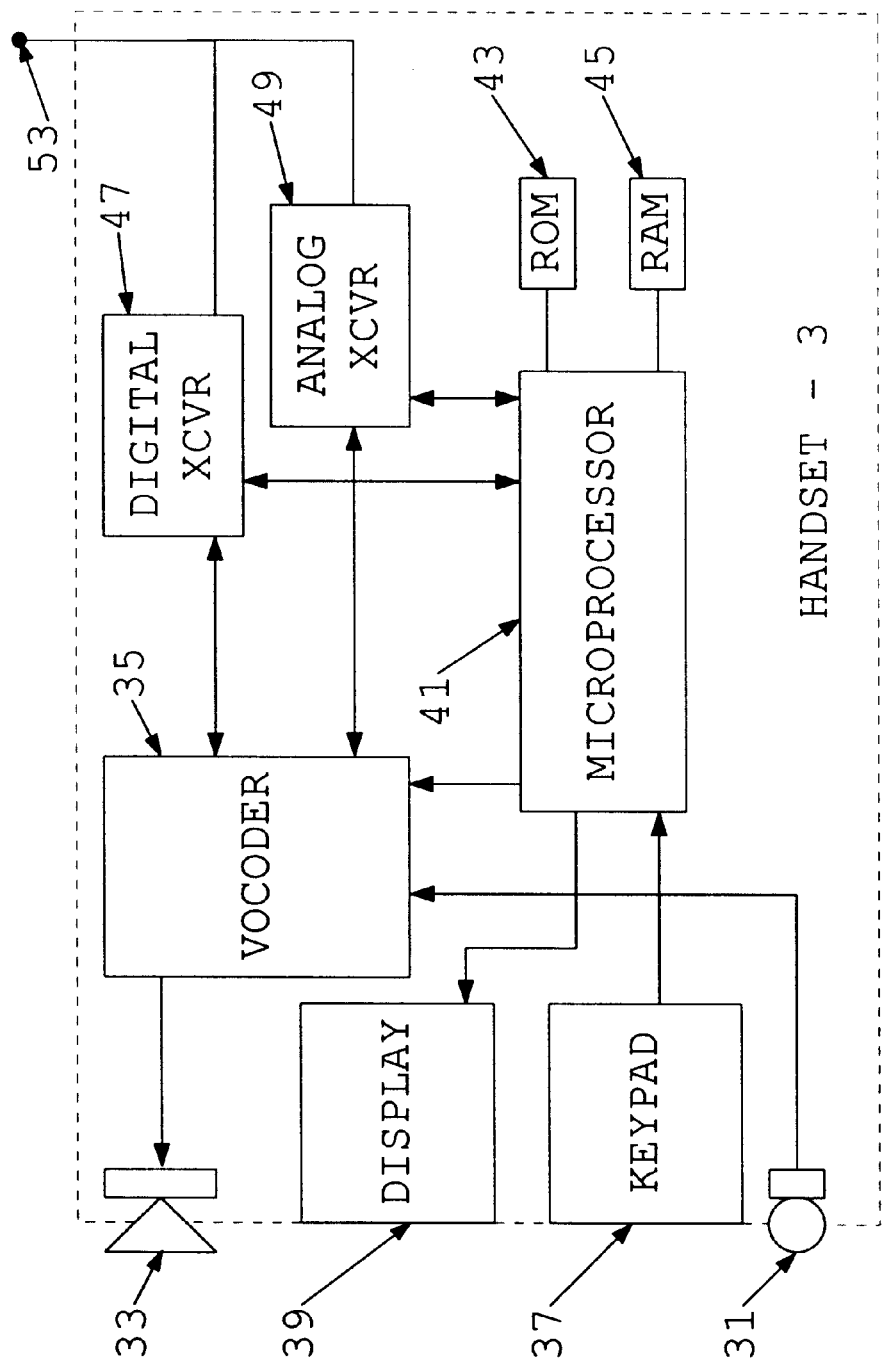
FIG. 2 is a block diagram of an exemplary wireless telephone station capable of implementing the inventive system selection operations.

FIG. 2 shows the major functional elements of an exemplary implementation of a typical handset or other mobile radiotelephone station 3. The exemplary handset is essentially a dual-mode (digital and analog service) type wireless telephone, as commonly used in cellular type networks. Those skilled in the art will recognize that concepts of the invention could easily be implemented in single-mode stations for any of the common analog or digital cellular or PCS type telephone services or in future deployed tri-mode (digital, analog and PCS) type customer stations. In each case, the telephone 3 is capable of implementing the system select control operations according to an embodiment of the present invention.

As shown, the handset 3 includes a microphone 31 for detecting audio frequency sonic energy and generating corresponding analog electrical signals. The handset 3 also includes a speaker 33 for generating audio frequency sonic energy in response to analog electrical signals. The microphone 31 and speaker 33 connect to voice coding and decoding circuitry (vocoder) 35. In a digital mode of operation, for example, the vocoder 35 provides two-way conversion between analog audio signals representing speech or other audio and digital samples at a compressed bit rate compatible with the digital protocol of the wireless telephone network communications.

For digital wireless communications, the handset 3 includes a digital transceiver (XCVR) 47. The invention encompasses embodiments utilizing any digital transceivers that conform to current or future developed digital wireless communication standards. For example, the transceiver 47 could be a TDMA or GSM unit, designed for cellular or PCS operation. In the preferred embodiments, the digital transceiver 47 is a CDMA cellular transceiver. The transceiver 47 provides two-way wireless communication of information, such as vocoded speech samples and digital message information. The handset also includes an analog transceiver 49, for example, conforming to AMPS. The transceiver 49 provides two-way voice communication, in analog format. The transceivers also provide two-way wireless communication of signaling data, for certain network functions such as registration and for call set-up. The transceivers 47, 49 connect through RF send and receive amplifiers (not separately shown) to an antenna 53.

In a digital mode of operation, the vocoder 35 provides the two-way conversion between analog audio signals representing speech or other audio and digital samples and exchanges those digital samples with the digital transceiver 47. In an analog mode of operation, the vocoder 35 or switches associated therewith (not separately shown) effectively bypass the conversion circuitry within the vocoder 35. In this mode, the signals pass between the analog transceiver 49 and the speaker 33 and microphone 31, in analog form.

The dual-mode digital telephone 3 includes a display 39 for displaying various messages to the user, for example status messages and control function menus. The telephone 3 also includes a keypad 37 for dialing digits and generating selection inputs keyed by the user based on displayed menus of available choices.

A microprocessor 41 controls all operations of the handset 3. The microprocessor 41 is a programmable device. The mobile unit 3 also includes a read only memory (ROM) 43 and/or a random access memory (RAM) 45, for storing various software routines and mobile configuration settings. Preferably, at least a portion of the RAM 45 is protected against loss of data due to loss of power. The software routines include programs such as device driver software and call processing software. The memories also store data, such as telephone numbers and other data input by the user via the keypad 37. Of particular note here, the stored programming includes executable code causing the microprocessor 41 to perform the routine necessary for the system select feature, as discussed in more detail later with regard to FIG. 6.

A portion of the protected memory is designated as a number assignment module (NAM). The NAM stores the mobile identification number (MIN), which is the directory number assigned to the mobile station. The NAM also stores the system identification (SID) for the system 20 serving the MIN assigned to the station. This SID also is the identification for the carrier's system that will serve as the "home" system for the particular mobile station. Another portion of the protected memory stores a preferred roaming list (PRL), which contains the SIDs of other systems operated by the customer's provider or with which that provider has established a favorable roaming agreement. As discussed more later, all of the system selection modes utilize the home SID and SIDs from the PRL to steer much of the station's call-traffic to the identified systems, and thereby provide service in a manner deemed optimum by the customer's service provider.

The keypad 37 supplies user input information to the microprocessor 41, and the microprocessor provides digital data signals to cause the display to show appropriate information to the user. Under control of the microprocessor 41, the display 39 shows textual information, such as dialed numbers and name and number information regarding stored speed dialing lists. The display 39 also may have certain specialized indicators, such as a message-waiting indicator and various roaming or home service indicators.

FIG. 3 shows the front of the cellular mobile station 3, in the form of a portable handset. As shown, the handset housing includes openings 55 enabling sound to emerge from the speaker 33, as well as openings 57 to allow input of sound to the microphone 31.

The handset 3 includes the visible display screen 39, shown as it might display the System Select settings menu used to select the mode in accord with the invention. The handset 3 also includes various keys making up the keypad 37. These include the standard set of dialing keys 61, shown with the numbers 0–9, the * and the # in the normal telephone configuration. Although not shown, many of the keys 61 also include letter designations, to enable input of alphabetical information.

The keypad 37 also includes a set of function keys 63, such as the send key 71 labeled "SND" used to initiate or answer a wireless call and the "END" key 73 used to terminate a wireless call. The function keys 63 also include a number of keys, which the customer uses to input information to and retrieve information from the processor and memory of the handset 3. Although other keys with other functions and/or labels may be used in place of or in addition to those shown, FIG. 3 shows three such function keys for purposes of the discussion here. The first of these keys is a two-way key 65 for controlling up and down movement of a displayed cursor or highlight function and attendant scrolling of menus shown on the display 39. The exemplary keys 63 also include a selection (SEL) key 67 to select an option indicated by the cursor or highlighting and a clear (CLR) key 69 to erase a selection. A wide variety of other cursor controls and selection inputs could be used.

Under control of the microprocessor 41 (FIG. 2) and its programming, the keypad 37 and the display 39 provide a user interface allowing the customer to input information and receive information. In accord with the invention, part of this user interface relates to the system select feature. The microprocessor 41 will cause the display 39 to show a menu of system selection options, and the microprocessor will set the station 3 to one of several available system selection modes in response to a subscriber selection as input via the keypad 37.

Those skilled in the art will recognize that the mobile station may implement a variety of other user interfaces. For example, the handset may use speech recognition and synthesis to provide an entirely speech-based user interface, for the System Select functions and/or other functions of the station.

The user interface to the System Select feature enables the user to access the System Select via the keypad 37 and the display 39. The programming will cause the handset to present a series of choices on the display 39. In the sample menu shown in FIG. 3, the user is presented with four System Selection settings for the four different selection modes. The modes include the "Home Only" mode, the "PRL Only" mode, the PRL/Pref. or PRL-Preferred mode, and the "PRL/Non" or PRL-NON Preferred mode. FIGS. 4A and 4B show alternative menu listings, with somewhat different names for several of the modes.

From the menu, the user will be able to choose any of the selections, for example, by operating the cursor control key 65 to move the cursor up or down to the desired line and the operating a selection key, such as the SEL key 67 shown in FIG. 3. The user may select any of the setting for an indefinite amount of time, except for the "PRL/Non" or PRL-NON Preferred selection.

In the example shown, the user may have operated the keys 65 and 67 in sequence to navigate through a series of menus to the System Select menu shown in FIG. 3 and to move the cursor shown on the display 39 to the "Home Only" line. If the user now operates the SEL key 67, to select the "Home Only" mode, the microprocessor of the handset 3 will set the System Select mode of operation to the Home Only mode. The user may go through similar procedures to select any of the other available System Select settings.

The PRL/Non Preferred selection remains active for only one phone call or for a set time period such as 5 minutes following selection of that mode. The user interface informs the user of this limitation. For example, when the user selects the PRL/Non mode, the station 3 prompts the user that the feature is available for a limited time; for example with a display such as shown in FIG. 5A. This also is an indication that a call through a system selected while operating in this mode may not be covered under the one-rate billing plan. Upon ending a call in this mode or the expiration of the timer, the microprocessor 41 of the handset 3 changes the system select mode back to the previous setting.

The programming for the system select feature and the PRL data are stored in memory within the station 3. Preferably, the executable code for the System Select feature permanently resides in memory in the station. From time to time, the service provider will reprogram at least the PRL, and it is possible to similarly change settings and/or reprogram the software for the System Select feature. Technicians in a shop may do the re-programming for the list and/or the executable programming, but preferably, the service provider will implement a system enabling programming of the station 3 over the air-link. U.S. patent application Ser. No. 09/123,454 filed Jul. 28, 1998 entitled "Digital Wireless Telephone System for Downloading Software to a Digital Telephone Using Wireless Data Link Protocol" discloses a preferred embodiment of a technique for over-the-air programming of data and executable code into the station 3.

When a customer subscribes with a PCS or cellular service provider, the provider assigns the customer's station to a system operated by that provider in the customer's home geographic area. That system becomes the subscriber/customer's home system. For purposes of this example, assume that the provider assigns the telephone 3 to the system 20 as its home system. The company that operates a customer's home system 20 collects billing information and bills the customer for the customer's use of the home system's radiotelephone services. Whenever a customer is operating his or her wireless station on a system other than the customer's home system, such as the system 21, the customer is engaging in an activity known as roaming. The cellular system upon which a roaming station is operating is viewed as a foreign system.

The mobile station stores the SID and any associated information necessary to find and recognize the home system in a memory location designated as the number assignment module (NAM). The NAM also stores the mobile identification number (MIN), which is the assigned mobile telephone number. The NAM associates the MIN with the electronic serial number (ESN) burned into the circuitry of the station 3. The provider may load the home SID into the NAM, using a manual operation by a technician; but preferably the service provider programs the SID and the MIN into the NAM as part of the initial over-the-air programming routine during service activation. Some stations may actually have more than one NAM.

The subscriber station 3 also maintains a stored list of 'preferred' systems, as a preferred roaming list (PRL). The 'preferred' systems are foreign systems 21 that the subscriber station may use as part of the one-rate service, because they are part of the operator's wide area system or because the home operator has established favorable roaming agreements with the local operators. For each of the 'preferred' systems, the list contains a system identification (SID) as well as acquisition parameters (band, frequency, mode, etc.). Some geographic regions may receive service from two or more 'preferred' systems. For systems that cover such a common geographical region, the stored PRL/SID list ranks the systems in the area. Such systems are prioritized or ranked based on desirability. For the one-rate service, the systems providing such overlapping service are typically ranked in terms of best cost from the service provider's perspective. In a preferred embodiment of the mobile station, the PRL has a minimum capacity of 256 System ID's per NAM.

The service provider stores an initial version of the PRL list in memory in the station 3, at the time of service activation. Again, the preferred approach is to download this list over-the-air at service activation. As the service provider's business arrangements change over time, the provider utilizes the same procedure to periodically download a new updated version of the PRL list, as a replacement for the previous version stored in the station. As part of the operation to change the PRL list, the carrier also may set certain parameters of the system Select Feature programming of the mobile station. For example, the carrier might change the parameters of the event detection in the PRL-Non Preferred mode, e.g. to wait a shorter or longer time before resetting, to allow two calls, or to reset to a different one of the earlier modes. For certain customers, the carrier may set the station to a particular mode, such as Home Only or PRL Only, in order to implement some certain limited subscription services. The provider may even download a new version of the executable software relating to the system select feature.

In the event of the station 3 not having the PRL list programmed into the phone, the following is preferred:

The phone may ONLY allow programming of the phone NAM via a tool or Over The Air (OTA) provisioning. This is to ensure that the PRL is properly loaded into the phone and to allow it to be programmed in the field and/or over the air.

When the station is powered on without the PRL, the station will alert the user that the PRL list is not available. The phone will display text such as "PRL Not Loaded" as shown in FIG. 5B.

The phone will continue to display "PRL Not Loaded" indication until a PRL is properly loaded. However, the phone should still allow calls to be processed. This will include calls to 911 and calls made for Over The Air provisioning. If the NAM is properly programmed, this may also include calls through the home system.

When the phone is scanning for service, the phone will display this condition, for example as shown in FIG. 5C.

Figure 6:
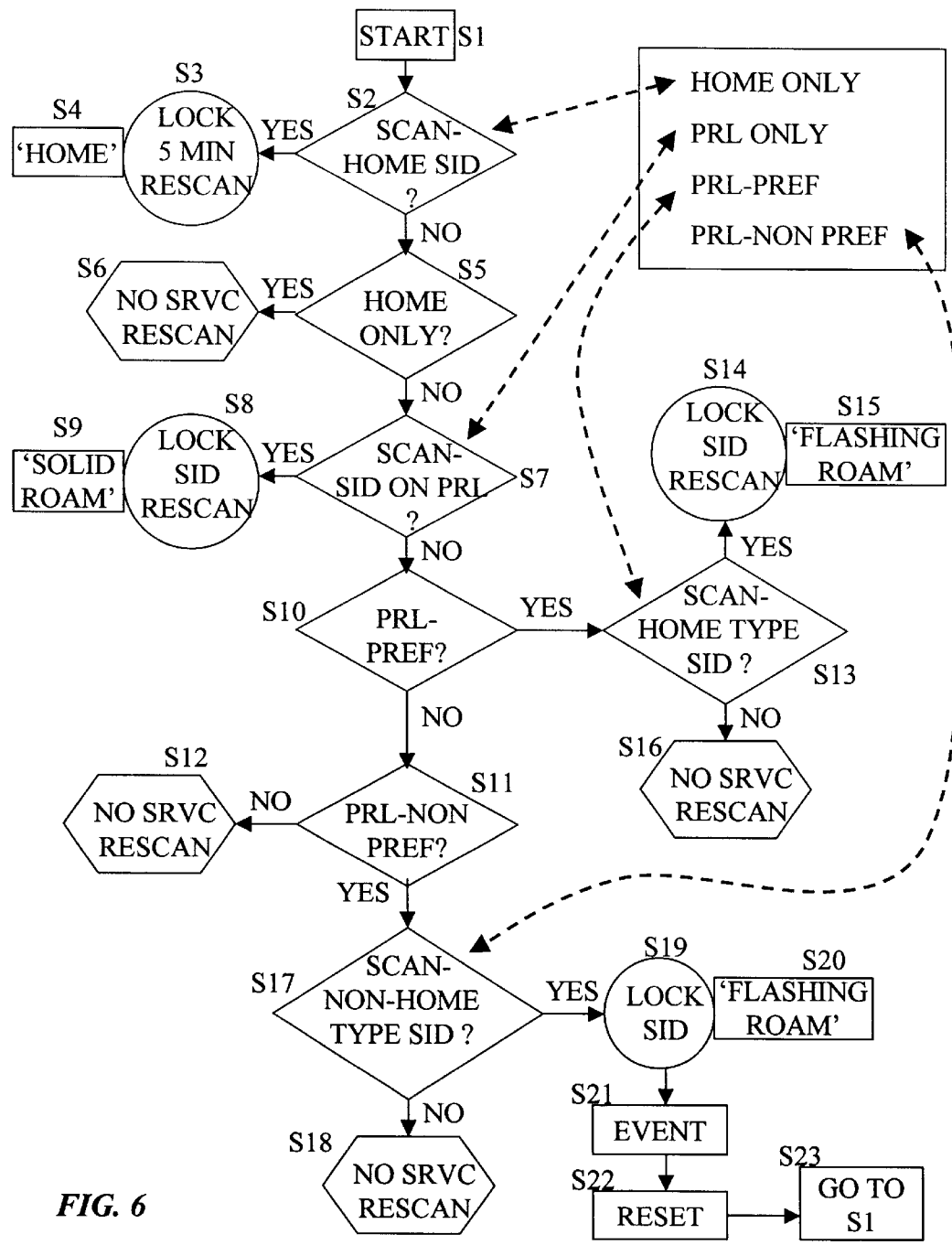
FIG. 6 is a flow-chart representing the operation process flow of a programmed station to perform the inventive system selection operations.

FIG. 6 is a diagram illustrating the method for selectively controlling a station 3 to select systems for operation, as described in more detail later. The station 3 stores a program for the microprocessor 41 causing it to execute the system selection methodology of FIG. 6 as discussed more, later. The station 3 also stores the SID of its home system in its NAM memory location and the preferred roaming list (PRL) of SIDs and related acquisition information, to enable the station to select the home system and the preferred systems. The executable code together with the data stored in the NAM and the PRL are software products used in the operation of the mobile station 3.

In accord with the invention, the system selection methodology steers the operation of the handset 3 to the selection of the home system 20 first and then to the best 'preferred' system as identified by SID in the PRL list. However, the system select feature programming of the station 3 also enables the customer to set the station 3 to one or more alternate modes that allow selection of other systems in the event that the home system is unavailable and no system on the PRL list is available.

In the preferred embodiment, the user interface of the station 3 allows the customer to set the station into four system select modes. The display 39 will show a menu of these possible selection mode settings, and the customer selects the desired mode setting from those shown by operation of the keypad 37. The four settings are Home Only, PRL Only, PRL Preferred, and PRL-Non Preferred. The PRL-Non Preferred setting is potentially the most costly, and therefore this setting is available only on a limited basis after selection thereof, for example for a short time period (e.g. five minutes) after selection or for one call following the selection. When selected, the station 3 will remain set in the other system selection modes until set to a different mode by some positive action by the customer.

In the Home Only mode, the station 3 detects SIDs identifying the systems available over the air. The station compares the SIDs to that of its home system stored in the NAM location within its internal memory. If there is a match, the station 3 will select and register with the home system 20. The display will indicate the Home system registration. If there is no match, for example because the customer has roamed outside the service area of that system, the station 3 will show a 'No Service' indicator on the display 39.

In the PRL Only mode, the station 3 again scans for the SID of its home system. This home system scan occurs first, such that if the station detects the home system SID, the station 3 will always select and register with the home system 20. However, in this mode, if there is no match to the home system SID stored in the NAM, the station 3 will compare the SIDs of available systems 21 to the stored PRL list.

The station 3 identifies the available SID(s) that are contained in the PRL list. If the station recognizes the SID of more than one preferred system, the station selects the most preferred system, as indicated by the hierarchy of the PRL list. The station 3 will select and register with the preferred system 21 identified by the PRL list processing. The PRL list may also dictate the type of display. For example, in this situation the display may indicate a 'Solid Roam' situation. Hence, the PRL list processing determines the priority of the SIDs in the list, and identifies which available system (by its SID) should be allowed to provide service.

In the PRL Only mode, if there is no matching SID after Home and PRL list processing, then there still is no service available. The station does not register, and the station 3 again will show a 'No Service' indicator on the display 39.

The PRL Preferred mode operates in a manner similar to the PRL Only mode but offers the customer a third option for obtaining service. The third option is one that is more costly to the one-rate service provider but is still acceptable since the selection methodology will steer the station to the home system and the preferred systems before selecting a system from the third option. In a preferred embodiment, this third option is to select a system operating on the same band (A, B or PCS A-F) as the home system 20 of the station 3. In most cases, there will be some type of existing roaming agreement between the service provider and operators of systems using the same band as the home system. However, these may be very general industry-wide agreements that are not nearly as favorable to the one-rate service provider as those agreements set-up with individual operators, as identified by SIDs in the PRL list. However, the one-rate service provider will likely absorb the added costs so as to provide the one-rate service even through these systems, because the selection process will limit the traffic through these systems.

In the PRL Preferred mode, the station 3 again scans first for the SID of its home system. If the station detects the home system SID, the station 3 will always select and register with the home system 20. Next, if there is no match to the home system SID stored in the NAM, the station 3 will compare the SIDs of available systems 21 to the stored PRL list. The station will select and register with the best available system using the PRL list. In the PRL Preferred mode, if there is no matching SID after home system processing and PRL list processing, the station scans for SIDs on the same band as used by its home system 20. If a SID is detected on that band, the station will select and register with the identified system. Again, the PRL list may dictate a display function. For example, in this situation, the station 3 may initiate a flashing 'Roam' indicator on the display 39. Consequently, the customer may obtain service under the single-rate plan even in areas not serviced by the home system or a system on the PRL list.

In the PRL Preferred mode, if the station 3 scans the same band as the home system and still detects no SID, then there is no service available. The station does not register, and the station 3 again will show a 'No Service' indicator on the display 39.

At this point, if there is still no service available, the inventive methodology offers the customer another option. In such situations, there often will be other compatible systems providing service in the foreign area where the customer is located at the time. However, there is likely no roaming agreement between the customer's service provider and those operating the systems in that area. To enable the customer to still obtain service, the methodology enables the customer to select the PRL-Non Preferred mode.

When the user selects the PRL-Non Preferred mode, the station 3 enters this mode for a finite time. The time period may be that of one call or a fixed period, for example, five minutes. The station 3 notifies the customer of the limited duration of this mode, for example by showing an explanation thereof on the display 39 (see FIG. 5A).

In the PRL-Non Preferred mode, the station 3 will still check for the home system and systems on the PRL list. Accordingly, if the home system or a preferred system becomes available, for example if the customer emerges from a shadow relative to one of those systems, the station may still register with the home system or a preferred system. However, in this mode, if the home and PRL list scanning operations fail to detect a SID for an acceptable system, the station 3 will scan for SIDs on the opposite band or some other band than that used by the home system. If a SID is detected on that other band, the station will select and register with the identified system. The station 3 will initiate a flashing 'Roam' indicator on the display 39. Consequently, the customer may obtain service. However, because there may be no agreement at all with the customer's service provider, the customer may need to arrange some other form of payment. For example, the service provider operating the non-preferred system on the opposite band may require that the customer provide credit card information before allowing the customer to make a telephone call through the system. The inventive handset operation, however, does allow the customer to see that service is available in the area and make a call.

When the five-minute time period or the one call has ended, the station exits the PRL-Non Preferred mode. In the preferred embodiment, when the station exits this mode it transitions to the PRL Only mode. Alternatively, when the station exits the PRL-Non Preferred mode, the station could return to any of the other modes that was in use just prior to entry into the PRL-No Preferred mode.

FIG. 6 is a flow chart illustrating the system selection routine of a station programmed to implement a preferred embodiment of the system selection procedures described above. Essentially, the station will cycle through this routine as it attempts to find and register with a system. The box in the top right corner of the drawing illustrates the display of the system selection options. The flow chart to the left illustrates the process flow, and the dotted line arrows between options shown the box and the flow chart indicate the association of certain process steps with the particular system selection modes set by the user.

As shown in FIG. 6, after starting the program (S1), the station microprocessor scans the appropriate band for the home SID and compares any detected SID(s) to the home system SID stored in the NAM (S2). If the station 3 detects the home SID, the station registers for communication with or "locks onto" the home system (S3). The station rescans periodically, for example, every three to five minutes. While registered with the home system, the station displays the indication 'Home' (S4).

Returning to step S2, if the microprocessor does not detect the SID of the home system, processing branches to step S5, where the microprocessor next checks the current selected mode of operation. If the station 3 is currently operating in the Home Only system selection mode, processing branches in step S5 to a step S6 in which the station displays a 'no service' indication. The station then initiates an immediate re-scan.

If the station is not in the Home Only processing mode after it fails to find the home SID, the microprocessor branches its process flow in step S5 so as to initiate processing based on the PRL list. Here, the station scans for SIDs on the PRL list (S7) and selects the most preferred one of any SIDs that it detects that match the list. If the station successfully detects a SID for a preferred system from the PRL list (YES branch), the station registers with or locks onto the selected 'preferred' system (S8). The station rescans periodically. While registered with the 'preferred' system, the station displays the indication 'Solid Roam' (S9).

Now assume that the PRL list processing in step S7 fails to detect an available preferred system. To this point in the program operation, the station has now failed to find a SID for the home system and failed to find a SID for a system on the PRL list. Stated another way, the scanning to this point has failed to detect a SID of an available system matching any of the SIDs stored in memory. The microprocessor again checks its mode of operation. First the microprocessor checks to see if the station is in the PRL Preferred mode (S10), and if not in that mode, the microprocessor checks to see if the station is in the PRL Non Preferred mode (S11). If the station is not in either of these modes, then it was set to the PRL Only mode. In the PRL Only mode, if the scan for the home system and the scan for SIDs on the PRL list both failed, the station displays a 'no service' indication and initiates a re-scan operation (S12).

Now assume that when the microprocessor checked the operating mode after the failure to find a SID for an available system on the PRL list (S10), and the microprocessor found that the station was operating in the PRL Preferred mode. If so, step S10 causes a branch to step S13, and the microprocessor causes the station to scan for SIDs of systems of the same type as the home system, typically for systems on the same band (S13). If the station now successfully detects a SID for a system of the same type as the home system (YES branch), the station registers with or locks onto that system (S14). The station rescans periodically. While registered with the system of the same type as the home system, the station displays a flashing 'Roam' indicator (S15). However, if this scan (S13) also fails in the PRL Preferred mode, the microprocessor causes the display 39 to show the 'no-service' indicator and initiates immediate re-scanning (S16).

Now assume that when the microprocessor checked the operating mode after the failure to find a SID on the PRL list, the microprocessor found that the station was not operating in the PRL Preferred mode (NO branch from S10) but instead was operating in the PRL Non-Preferred mode (YES branch from S11). If so, the microprocessor causes the station to scan for SIDs of systems of another type than that of the home system (S17). Preferably, the station scans for systems on a different or opposite band from that used by the home system. In a standard cellular context, this scan would cover the opposite A or B band from that used by the home system. If the station can operate on PCS bands, this scan would cover all bands other than that used by the home system. If this scan also fails in the PRL Non-Preferred mode, the microprocessor causes the display 39 to show the 'no-service' indicator and initiates re-scanning (S18). For this to happen there must be no compatible system at all providing any service covering the roaming customer's current location.

If the station successfully detects a SID for a non-home type system (YES branch from S17), the station locks onto that system (S19). While registered with the non-home type system, the station displays a flashing 'Roam' indicator (S20).

In the PRL Non-Preferred mode, the microprocessor looks for the occurrence of a predetermined event (S21). In the example, the microprocessor looks for the event following a lock to a non-preferred system. However, this limit subroutine could follow selection of the PRL Non-Preferred mode. Preferably, the microprocessor times the period of operation for this mode and detects any call activity while in this mode. The microprocessor allows the station to stay in this mode for only five minutes or for a single call. After the period or the end of the one call, the microprocessor resets the station to the PRL Only mode (S22), and processing returns from S23 to S1 to initiate rescanning in that mode.

The only exception to the system selection process described above relates to emergency call processing. In the event that the user places a 911 call, the mobile station processes the call immediately. If the mobile telephone is currently in a NO Service condition, the telephone abandons the PRL scanning method and scans for any system that is available and then processes the call.

An aspect of the invention relates to a software product comprising a machine-readable medium and executable code carried by that medium. The code, executable by the processor of the mobile station, enables the station to perform at least the system selection operations discussed above with regard to FIG. 6. The code also will typically enable certain user interface functions associated with the PRL list management and the mode selection functions. The product may also include the executable code that the station uses to control a variety of other operating functions.

When loaded into the mobile station, the executable code and any associated data reside in one or more of the memories 43, 45 of the station and are loaded into working memory space or registers within the microprocessor 41 within the station 3, as needed for operation. As such, one type of medium, which will bear the executable code of the product comprises various physical storage media used in the station 3 itself. As noted earlier, the executable code and any associated data, such as the PRL list, may be loaded from a server into memory in the handset. Thus, another type of medium that may bear the executable code comprises memory devices commonly used in servers or other computers. Examples of this later type of media include hard and floppy disk drives, JAZZ drives, ZIP drives, CD-ROM, data tape drives, semiconductor memories, PCMCIA cards, etc., as well as various scannable media enabling loading of the code into the server.

The transfer from the server to the mobile station may utilize a direct electrical connection from a port of the server to a data port on the mobile station. Alternatively, the server may send the programming through a network, to download the code and associated data to the mobile station. The download signal typically will travel through some landline portion of the network, but it preferably utilizes the air-link to finally reach the mobile station. Hence, another class of machine-readable medium encompasses optical, electrical, and electro-magnetic signals or waves for carrying the code and associated data both on physical links and on wireless links. The code and data may be transferred into the server in a similar fashion.

The system selection techniques described above are particularly advantageous where a wireless service provider intends to offer service covering a wide geographic area using a single-rate billing plan. A single-rate billing plan can encompass most and possibly all of the calls made by the one-rate subscribers within the geographic area. The service provider bills calls at only the one rate, at least for all calls through the home system 20 and for all calls through any other systems 21 identified as "preferred" systems in memories in the mobile stations 3 (as selected in steps S2–S9). The service provider also bills subscribers at the one-rate for calls completed through some other systems, preferably those systems detected during scanning of the home-system band. Stated another way, if any operation results in a system selection in steps S2 through S16, and the user makes or receives a call through a system selected in that manner, then the provider bills the subscriber at the one-rate.

Typically, roaming agreements with other carriers operating on the home-band are not as favorable as those offered by preferred systems. However, such agreements with operators of home-band systems typically are still relatively reasonable. The one-rate service provider preferably accepts the slightly higher costs for services through such alternative systems, as part of the cost of offering the popular one-rate service. In actual practice, operation in any system selection mode, including that involving the home-band scans, will still effectively steer the bulk of all traffic through the home system and the preferred systems, minimizing exposure to the slightly less favorable roaming rates.

The service provider could opt for charging the one-rate even for calls completed through a system found only in the non-home scan (S17–S20). In the presently preferred billing technique, however, the actual selection of a system on the non-home band and completion of a call for a mobile station 3 will result in a charge that may be different from the one-rate plan. If there is some billing mechanism that applies to roaming to such a system, the one-rate service provider may handle the billing to the subscriber. However, often no such arrangement exists, and the user must make his or her own billing arrangements with the system operator on a per-call basis. It is currently envisioned that the user will often interact with the system or operational personnel to arrange billing for each individual call to the user's credit card account. However, even in such situations, the user can see that service is available and can complete a call if necessary. The user is not left completely without service if there is any compatible system available, at all.

The invention admits of many further modifications. For example, in addition or in place of the event-limited operation in the PRL-Non Preferred mode, the mobile station could operate in a similar event-limited fashion in the PRL-Preferred mode. In such an operation, the mobile station would scan for a system of the same type as the home system for a predetermined time period or until the station completes one call. After the predetermined event (time or one call), the station would automatically shift to the PRL Only mode. Many manufacturers may elect to program the stations so that they are capable of event-limited operation in each of these two modes and allow the service provider to set a flag in the memory of the station to activate each type of event-limited control of these two mode selections.

Those skilled in the art will recognize that the present invention admits of a number of modifications, within the spirit and scope of the inventive concepts. While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A mobile communication station, comprising:

a wireless transceiver for two-way communication via a selected one of a plurality of public wireless communication systems and for signaling with the public wireless communication systems;

a programmable controller coupled to the wireless transceiver for controlling operation thereof;

a memory coupled to the controller;

a user interface coupled to the programmable controller to enable a user of the mobile station to provide a selection input to the programmable controller; and a program for execution by the programmable controller, execution of the program causing the mobile station to operate in at least two modes in response to the selection input by the user as follows:

in a first one of the modes, the programmable controller causes the transceiver to scan an air-interface only for a system identification matching an identifier stored in the memory and register for communication through a system broadcasting the matching system identification; and if a user selects a second one of the modes, the programmable controller causes the transceiver to first scan the air-interface for a system identification matching an identifier stored in the memory of the mobile station and register for communication through a system broadcasting the matching system identification, and if the mobile station fails to detect a match for a stored identifier on the air interface, the programmable controller causes the transceiver to perform an alternate scan of an air-interface to find an identifier for another system not identified in the memory of the mobile station and to register for communication with said another system if an identifier for said another system is found during the alternate scan.

2. A mobile station as in claim 1, wherein the transceiver comprises a cellular transceiver.

3. A mobile station as in claim 2, wherein the cellular transceiver comprises a code division multiple access transceiver.

4. A mobile station as in claim 2, wherein the cellular transceiver comprises an analog cellular transceiver and a digital cellular transceiver.

5. A mobile station as in claim 1, wherein the user interface comprises a display coupled to the programmable controller for displaying information including at least one mode selection option, and one or more keys coupled to the programmable controller for obtaining the selection input while the display shows the at least one mode selection option.

6. A mobile station as in claim 1, wherein in the first mode, the programmable controller causes the transceiver to scan the air-interface only for a system identification consisting of an identifier of a home system assigned to serve the mobile station and only register with a system broadcasting the home system identifier.

7. A mobile station as in claim 1, wherein:
the memory stores a list of system identifiers for preferred public wireless communication systems, and
in the first mode, the programmable controller causes the transceiver to register for communication with any system broadcasting an identification matching any one of the system identifiers contained in the list.

8. A mobile station as in claim 1, wherein:
the memory stores a system identifier for a home system assigned to serve the mobile station and a list of system identifiers for preferred public wireless communication systems, wherein in the first mode:
the programmable controller causes the transceiver to conduct a first scan of the air-interface for a system identification consisting of the home system identifier and register with a system broadcasting the home system identifier if the transceiver detects the home system identifier on the air-interface, and
if the mobile station does not detect a system broadcasting the home system identifier, the programmable controller causes the transceiver to conduct a second scan of the air interface and register with a predetermined system if the predetermined system broadcasts an identification matching any one of the system identifiers contained in the list.

9. A mobile station as in claim 1, wherein if the user selects the second mode, the programmable controller operates the transceiver in the second mode until detection of a predetermined event, and upon detection of the predetermined event, the programmable controller shifts the transceiver to operation in the first mode.

10. A mobile station as in claim 9, wherein the predetermined event comprises expiration of a specific time interval of operation in the second mode.

11. A mobile station as in claim 9, wherein the predetermined event comprises a single call for the mobile station while operating in the second mode.

12. A mobile station as in claim 1, wherein the alternate scan of an air-interface in the second mode comprises scanning a communication band corresponding to a communication band used by one of the systems assigned to serve as a home system for the mobile station.

13. A mobile station as in claim 1, wherein the alternate scan of an air-interface in the second mode comprises scanning a communication band other than a communication band used by one of the systems assigned to serve as a home system for the mobile station.

14. A mobile station as in claim 1, wherein the program for the programmable controller causes the mobile station to operate in at least three modes in response to the selection input by the user.

15. A mobile communication station, comprising:
a wireless transceiver for two-way communication via a selected one of a plurality of public wireless communication systems and for signaling with the public wireless communication systems;
a programmable controller coupled to the wireless transceiver for controlling operation thereof;
a memory coupled to the controller;
a user interface coupled to the programmable controller to enable a user of the mobile station to provide a selection input to the programmable controller; and
a program for execution by the programmable controller, execution of the program causing the mobile station to operate in at least three modes in response to the selection input by the user as follows:
if a user selects a first one of the modes, the programmable controller causes the transceiver to scan an air-interface only for a system identification matching an identifier stored in the memory and register for communication through a system broadcasting the matching system identification;
if a user selects a second one of the modes, the programmable controller causes the transceiver to first scan the air-interface for a system identification matching an identifier stored in the memory of the mobile station and register for communication through a system broadcasting the matching system identification, and if the mobile station fails to detect a match for a stored identifier on the air interface, the programmable controller causes the transceiver to perform an alternate scan of an air-interface to find an identifier for another system not identified in the memory of the mobile station and to register for communication with said another system if an identifier for said another system is found during the alternate scan; and
if a user selects a third one of the modes, the programmable controller causes the transceiver to first scan the air-interface for a system identification matching an identifier stored in memory of the mobile station and register for communication with a system broadcasting the matching system identification if a match is detected, and if the mobile station fails to detect a match for a stored identifier on the air interface, the programmable controller causes the transceiver to perform a second alternate scan of an air-interface different from the first alternate scan of an air interface to find an identifier for another system.

16. A mobile station as in claim 15, wherein:
the alternate scans comprise scans of different communications bands, and
one communication band comprises a band corresponding to a communication band used by one of the systems assigned to serve as a home system for the mobile station.

17. A mobile station as in claim 15, wherein if the user selects the third mode, the mobile station operates in the third mode until detection of a predetermined event, and upon detection of the predetermined event, the mobile station shifts to the first mode.

18. A mobile station as in claim 17, wherein the predetermined event comprises passage of a predetermined time interval following selection of the third mode by the user.

19. A mobile station as in claim 17, wherein the predetermined event comprises a single call for the mobile station through another system selected as a result of the second alternate scan.

20. A method of operating a mobile station to select and operate through selected ones of a plurality of public wireless communication systems, comprising:

detecting a first user selection;
in response to the first user selection operating in a first mode to execute the following steps:
  (a) scanning an air-interface to detect a system identification broadcast by a system, and
  (b) registering for communication with the system only if the detected identification matches an identifier stored in memory of the mobile station;
detecting a second user selection; and
in response to the second user selection operating in a second mode to execute the following steps:
  (i) scanning the air-interface first for a broadcast system identification matching an identifier stored in memory of the mobile station,
  (ii) registering for communication with a system if a detected broadcast identification matches an identifier stored in memory of the mobile station, and
  (iii) if there is no match to a stored identifier detected during scanning of the air interface in the second mode, performing an alternate scan of an air-interface; and
  (iv) registering for communication with another system not identified in the memory of the mobile station found during the alternate scan.

21. A method as in claim 20, wherein the identifier stored in memory of the mobile station consists of an identifier of a system assigned as a home system for the mobile station.

22. A method as in claim 20, wherein the memory stores a plurality of system identifiers, including an identifier of a system assigned as a home system for the mobile station and identifiers for a plurality of preferred systems.

23. A method as in claim 20, further comprising changing from the second mode to the first mode upon occurrence of a predetermined limiting event.

24. A method as in claim 23, wherein the predetermined limiting event comprises completion of a call for the mobile station while operating in the second mode.

25. A method as in claim 23, wherein the predetermined limiting event comprises passage of a specific time interval of operation in the second mode.

26. A method as in claim 25, wherein the alternate scan of an air-interface comprises scanning a band assigned to a system serving as a home system for the mobile station.

27. A method as in claim 25, wherein the alternate scan of an air-interface comprises scanning a band that is different from a band assigned to a system serving as a home system for the mobile station.

28. A software product, comprising:
a machine readable medium for bearing information; and
executable code carried as the information on the machine readable medium, the executable code forming a control program for a mobile communication station operable to communicate through selected ones of a plurality of public wireless communication systems and for signaling with the public wireless communication systems, the control program causing the mobile station to perform the following steps when a processor of the mobile station executes the code:
detecting a first user selection;
in response to the first user selection operating in a first mode to execute the following steps:
  (a) scanning an air-interface to detect broadcast of a system identification, and
  (b) locking onto an available system only if the detected broadcast identification of the available system matches an identifier stored in memory of the mobile station; and
detecting a second user selection; and
in response to the second user selection operating in a second mode to execute the following steps:
  (i) scanning the air-interface first for a broadcast system identification matching an identifier stored in memory of the mobile station,
  (ii) locking onto an identified system if a detected identification broadcast by the identified system matches an identifier stored in memory of the mobile station, and
  (iii) if there is no match to a stored identifier detected during scanning of the air interface in the second mode, performing an alternate scan of an air-interface; and
  (iv) locking onto another system not identified in the memory of the mobile station found during the alternate scan.

29. A software product as in claim 28, wherein the identifier stored in memory of the mobile station consists of an identifier of a system assigned as a home system for the mobile station.

30. A software product as in claim 28, wherein the memory stores a plurality of system identifiers, including an identifier of a system assigned as a home system for the mobile station and identifiers for a plurality of preferred systems.

31. A software product as in claim 28, further comprising changing from the second mode to the first mode upon occurrence of a predetermined limiting event.

32. A software product as in claim 31, wherein the predetermined limiting event comprises completion of a call for the mobile station.

33. A software product as in claim 31, wherein the predetermined limiting event comprises passage of a specific time interval of operation in the second mode.

34. A software product as in claim 33, wherein the alternate scan of an air-interface comprises scanning a band assigned to a system serving as a home system for the mobile station.

35. A software product as in claim 33, wherein the alternate scan of an air-interface comprises scanning a band that is different from a band assigned to a system serving as a home system for the mobile station.

36. A method of providing a substantially one-rate wireless communication service for wireless subscribers over a wide geographic area, comprising:
establishing a home wireless communication system for providing wireless services for mobile stations of the subscribers at the one rate;
identifying a plurality of foreign wireless communication systems as preferred systems for providing wireless services for mobile stations of the subscribers at a preferential rate, the home system and the preferred systems providing service over at least a substantial portion of the wide geographic area;
storing system identifiers for the home system and the preferred systems in the mobile stations;
programming the mobile stations to selectively operate in two system selection modes in response to user inputs,
wherein in the first mode, each programmed mobile station executes the following steps:
  (a) scanning an air-interface to detect a system identification, and
  (b) registering only with a system broadcasting a detected identification matching an identifier stored in the memory of the mobile station;

wherein in the second mode, each programmed mobile station executes the following steps:
- (i) scanning the air-interface first to detect a system identification,
- (ii) registering with a system broadcasting a detected identification matching an identifier stored in the memory of the mobile station during the scan of the air-interface, and
- (iii) if there is no match to a stored identifier detected during scanning of the air interface in the second mode, performing an alternate scan of an air-interface; and
- (iv) locking onto another system not identified in the memory of the mobile station identified during the alternate scan; and billing the subscribers at only the one rate at least for all calls through the home system and all calls through any of the preferred systems.

37. A method of providing a substantially one-rate wireless communication service as in claim 36, wherein:

the alternate scan of an air-interface comprises scanning a band assigned to the home system; and the billing step further comprises billing the subscribers at only the one rate for any calls through said another system.

38. A method of providing a substantially one-rate wireless communication service as in claim 36, wherein:

the alternate scan of an air-interface comprises scanning a band different from a band assigned to the home system; and the method further comprises notifying a user of a mobile station of a limitation, upon selection of the second mode.

39. A method of providing a substantially one-rate wireless communication service as in claim 38, wherein calls through another system may result in billing at a rate different from the one-rate.

40. A method of providing a substantially one-rate wireless communication service as in claim 38, wherein calls through another system may require billing to credit cards of the subscribers.

* * * * *